C. H. SCHURR AND E. J. LEES.
THREAD MILLING MACHINE.
APPLICATION FILED MAY 20, 1922.
Reissued July 11, 1922.
15,410.
4 SHEETS—SHEET 1.
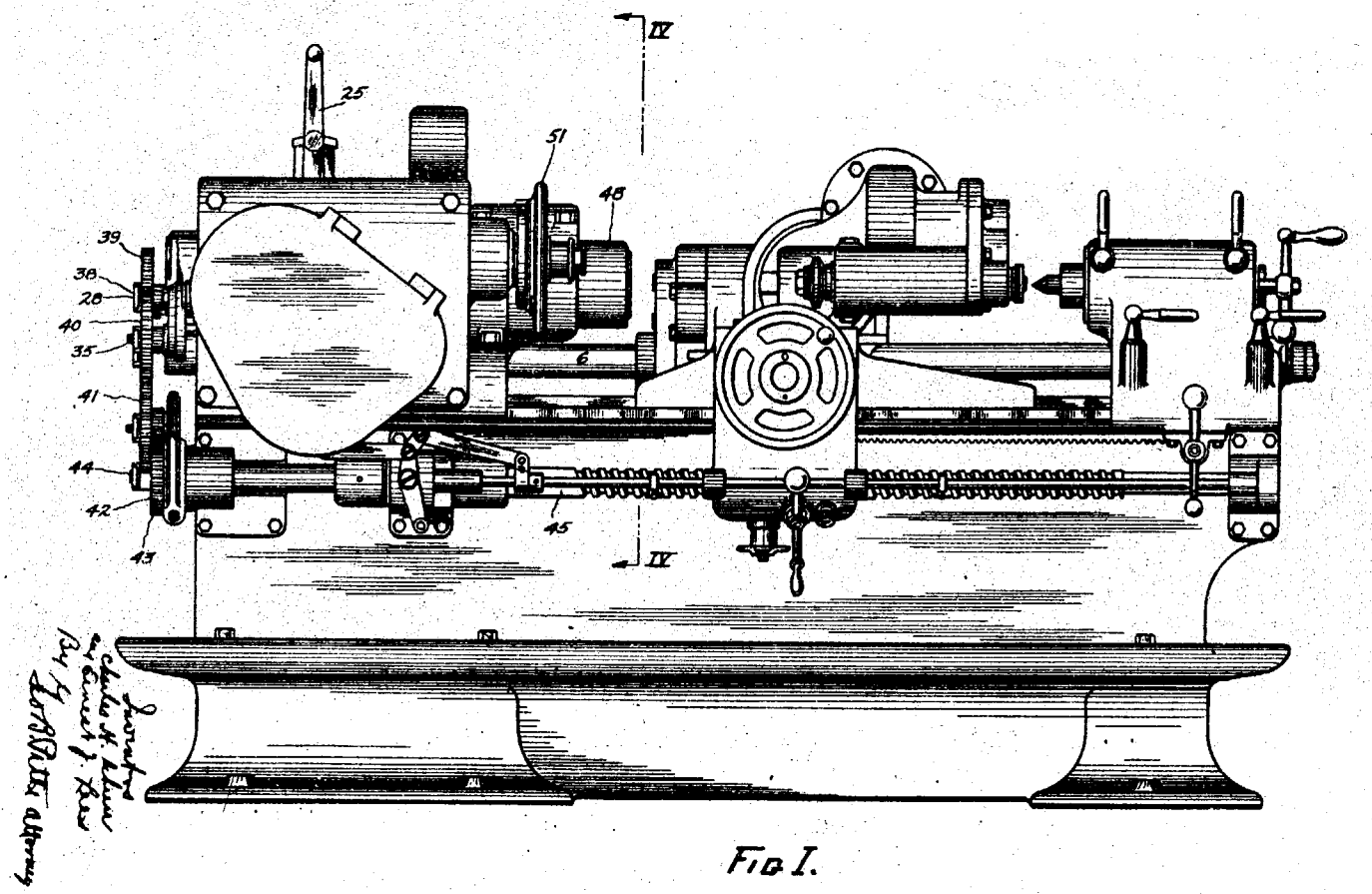
FIG. I.
Inventors
Charles H. Schurr
and Ernest J. Lees
By Geo B. Potter Attorney C. H. SCHURR AND E. J. LEES.
THREAD MILLING MACHINE.
APPLICATION FILED MAY 20, 1922.
Reissued July 11, 1922. 15,410.
4 SHEETS—SHEET 2.
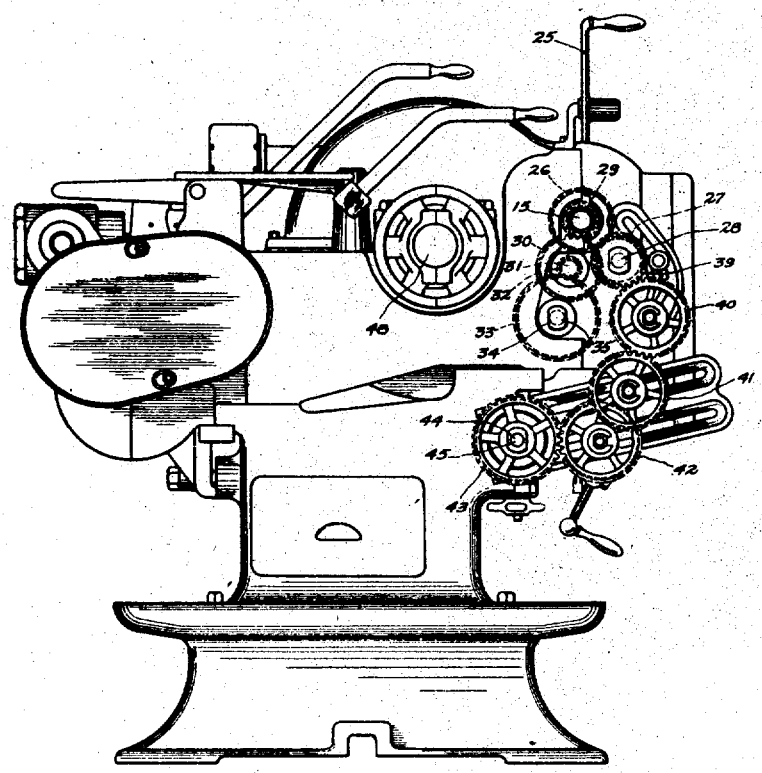
Fig. II
Inventors
Charles H. Schurr
and Ernest J. Lees
By
Geo R Pitts
attorney C. H. SCHURR AND E. J. LEES.
THREAD MILLING MACHINE.
APPLICATION FILED MAY 20, 1922.
Reissued July 11, 1922. 15,410.
4 SHEETS—SHEET 3.
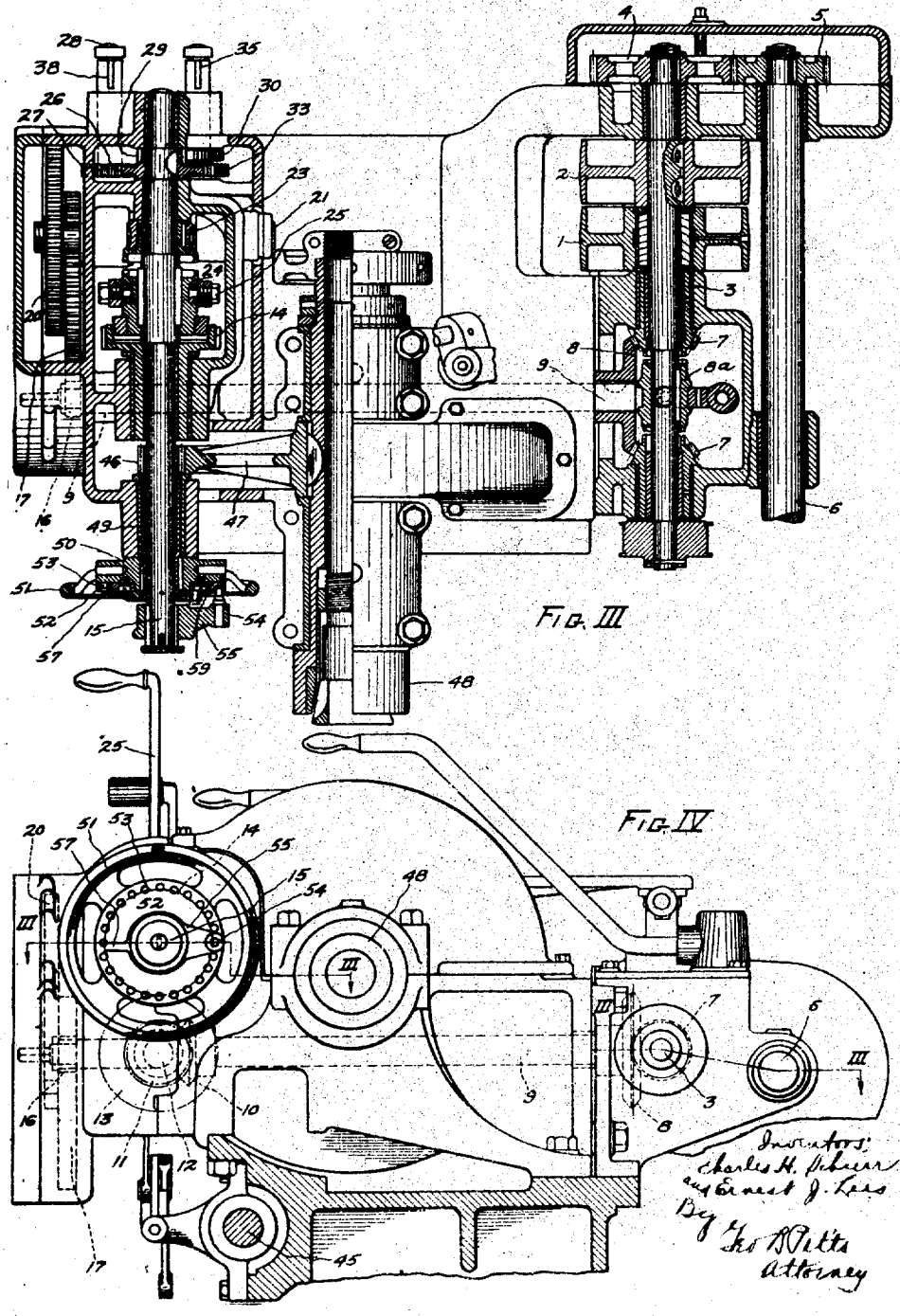

C. H. SCHURR AND E. J. LEES.
THREAD MILLING MACHINE.
APPLICATION FILED MAY 20, 1922.
Reissued July 11, 1922. 15,410.
4 SHEETS—SHEET 4.
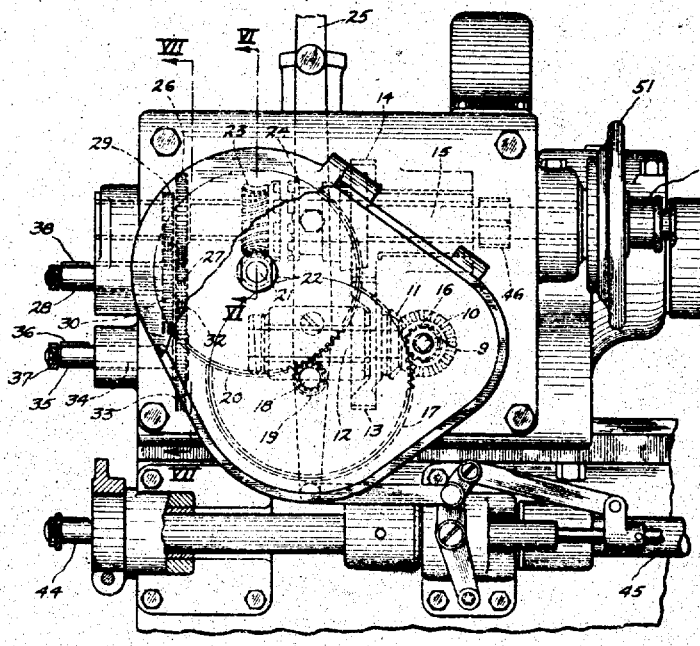
FIG. V
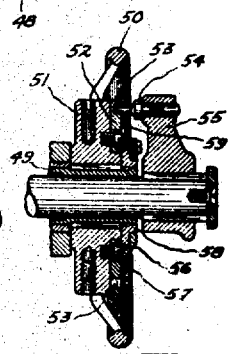
FIG. IX
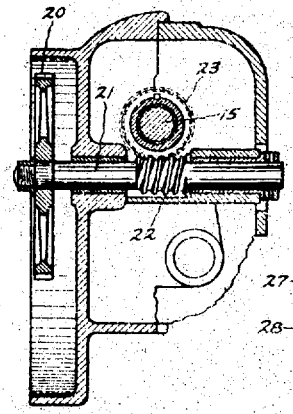
FIG. VI
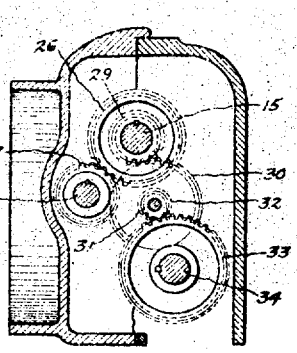
FIG. VII
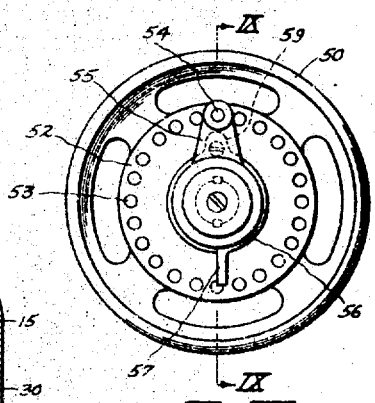
FIG. VIII
Inventors,
Charles H. Schurr
and Ernest J. Lees
By Geo. B. Pitts Attorney

UNITED STATES PATENT OFFICE.

CHARLES H. SCHURR AND ERNEST J. LEES, OF CLEVELAND, OHIO, ASSIGNORS TO THE LEES-BRADNER CO., OF CLEVELAND, OHIO.

THREAD-MILLING MACHINE.

15,410. Specification of Reissued Letters Patent. Reissued July 11, 1922.

Original No. 1,355,854, dated October 19, 1920, Serial No. 210,633, filed January 7, 1918. Application for reissue filed May 20, 1922. Serial No. 562,527.

*To all whom it may concern:*

Be it known that we, CHARLES H. SCHURR and ERNEST J. LEES, both citizens of the United States of America, residing at 6210 Carnegie Ave., city of Cleveland, in the county of Cuyahoga and State of Ohio, have invented a new and useful Improvement in Thread-Milling Machines, of which the following is a specification, the principle of the invention being herein explained and the best mode in which we have contemplated applying that principle, so as to distinguish it from other inventions.

Our invention is related to a thread milling machine and more particularly to a single improvement associated with the train of gears commonly employed to predetermine the coordination or relative rates of speed between some particular spindle and the lead screw.

Heretofore, power thus transmitted at the head stock was taken from a projecting end extremity or stud of a reduction spindle, which stud, of course, made a given number of revolutions and could be satisfactorily connected by a train of gears to the lead screw for finer pitches. In the case, however, of long leads it was necessary, if the gearing was to likewise extend between such single reduction spindle and the lead screw, to recompute and re-arrange such gearing. Our invention comprehends the simple idea of having a second more rapidly rotating spindle extremity serve as an additional stud from whence the gear reduction to the screw could be taken for longer leads.

We would have it expressly understood that we in no wise limit ourselves to this specific application or embodiment of our invention, which we have selected as a basis for illustrating and describing our invention merely for the purpose of rendering a clear and comprehensive understanding of the scope and novel features thereof.

Averting to the drawings:

Figure I is a front elevation of a thread milling machine embodying our invention.

Fig. II is a head stock end elevation of the same.

Fig. III is an enlarged horizontal section of the head stock end of the machine to disclose the manner in which power is transmitted.

Fig. IV is a correspondingly enlarged vertical section on line IV—IV of Fig. I.

Fig. V is a partial front elevation to similar scale showing certain internal driving connections in dotted lines.

Fig. VI is a vertical section on line VI—VI of Fig. V.

Fig. VII is a vertical section on line VII—VII of Fig. V.

Fig. VIII is an end elevation of one detail of the mechanism.

Fig. IX is a section on line IX—IX of Fig. VIII.

Power originates at the loose and fast pulleys 1 and 2 respectively seen in Fig. III, and from there may be cursorily traced in so far as its route of transmission is common in the machines upon which this invention is a slight though certain and important improvement. The shaft 3 is rotated by the tight pulley 2 and such movement is communicated through gears 4 and 5 to a spline shaft 6 leading in the customary manner to the cutter drive carried by a swivel head. The shaft 3 transmits power to mechanism both for rotating the blank and for effecting the lead of the tool. It carries loosely the bevel pinions 7 each of which meshes with a bevel gear 8 upon a cross shaft 9 leading to the front of the machine as appears in Fig. IV. A clutch $8^a$ is adapted to transmit the drive to the shaft 9 from either pinion and therefore in opposite directions. The latter continuously drives a bevel pinion 10 which in turn drives a bevel gear 11 on a short shaft 12 as may be clearly seen in Fig. V. Such shaft 12 drives a gear 13 which meshes with a gear 14 loosely mounted on a shaft 15 whereby the latter, when clutched thereto, may be driven at a given speed. Upon the end of the shaft 9 is another pinion 16 engaging with a wheel 17 on a shaft 18. The latter has mounted upon it a pinion 19 which meshes with a large gear 20 secured to a higher spindle 21 which is fashioned with a worm 22 as is shown in detail in Fig. VI. The worm 22 serves to drive the worm wheel 23 likewise loosely mounted on the shaft 15 and designed to rotate the same if clutched thereto at a slower rate of speed than through the agency of the gear 14. A clutch 24 operated by a lever 25 is adapted to fix either the gear 14 or wheel 23 to the shaft 15 whereby to rapidly move the work or to more slowly drive it as required during the cutting operation, respectively, as will later become evident.

That part of the machine which our present invention is more particularly associated is best disclosed in Figs. II, V and VII, the former being an end view, the next an elevation of a portion of the front with the parts inclosed thereby, a gear box cover appearing in dotted lines and the last being a vertical cross section looking toward the end illustrated in Fig. II. The secondary driving shaft 15 carries near its extremity a pinion 26 which meshes with a gear 27 near the inner end of a spindle 28. Outwardly adjacent the gear 26 and likewise upon the spindle 15 is a pinion 29 which meshes with a gear 30 on another lower and necessarily more slowly moving spindle 31. Similarly mounted upon the spindle 31 inwardly adjacent the gear 30 is a pinion 32 which engages a large gear 33 that is keyed to the inner end of a lower and still more slowly moving spindle 34. The other end of the spindle 34 projects outwardly beyond and serves as a driving stud 35, being there provided with a spline 36 and securing nut 37. As so arranged the stud 35 constitutes what will be referred to as the slow or ordinary source from which power may be and heretofore always has been communicated according to a predetermined harmonious relation through a train of gears. Such train is commonly known as the indexing train and may be varied at will according to the lead which it is required to impart for the particular job. It should be understood that the indexing train has been omitted from Fig. V in order more clearly to show that the first gear forming a part thereof and which is to be secured upon the stud 35 is to be removably secured thereto for the double purpose of allowing the substitution therefor of a gear having a different number of teeth and besides so that the indexing train may have its power inception elsewhere as will now be explained. The feature of our invention consists in having the spindle 28 also project outwardly beyond the machine to serve as another splined stud 38 from which power may be alternatively taken through the indexing train consisting of the bodily shiftable gears 39, 40, 41, 42 and 43, the last mentioned of which is secured to the splined extremity 44 of the lead shaft 45. The stud 38 is necessarily rotating faster than the stud 35 and in fact, upon machines which we have built, so as to rotate twelve times as fast. By thus making two studs available where heretofore there has been only one, from either of which power may be communicated through the indexing train, we have been enabled greatly to simplify the computation and rearrangement of the indexing train for different jobs.

Keyed to the shaft 15 is a pinion 46 which meshes with a large gear 47 similarly secured to the work spindle 48. It is manifest that the rotation of such spindle in different directions and at different speeds is readily determined by the clutch control lever 25. The pinion 46 carries a sleeve extension 49 to which an indexing wheel 50 is attached, by means of its hub 51. To the hub 51 a plate 52 is screwed and the latter is provided with holes 53 for receiving a pin 54 which is mounted in an arm 55. This arm 55 is slidably splined on the secondary drive shaft 15 and therefore always rotates with this shaft. When the secondary drive shaft is rotating and the pin 54 is in one of the holes 53, the pinion 46 is caused to rotate which in turn rotates the work. When it is desired to index the work after the driving shaft 15 has stopped, the arm 55 is moved to the right until the pin 54 is disengaged. The hand wheel 50 is then rotated whatever number of revolutions and fraction of a revolution may be necessary to properly index the work. It is a comparatively simple matter for the operator to remember the number of complete revolutions required for each indexing but the fraction of the revolution is more difficult. To overcome this difficulty we have provided two rings mounted one upon the other and which may be tersely described because not new and not claimed. One ring 56 is provided with a pointer 57 and the other ring 58 has a pointer 59, and is rotatably mounted on the sleeve 49. The ring 58 is frictionally held against rotation by means of an ordinary wire spring (not shown) and is to be rotated until the pointer 59 is in line with the pin, whereupon the other ring 56 is rotated until its pointer 57 indicates the fraction of the revolution through which it becomes necessary to turn the indexing wheel. For instance if it is necessary to turn the hand wheel $5\frac{1}{4}$ revolutions the pointer 57 will be 90° from the pointer 59. The rings can be locked together by means of a screw so that the angular relation between the pointers of the rings will not be accidentally changed.

We claim:

1. A thread milling machine comprising a work spindle, a tool spindle, means for rotating each, a movable support for one of said spindles, a lead screw operatively connected with said support and adapted to actuate the same, intermediary spindles, a train of gearing upon said spindles respectively in part adapted to connect said work rotating means with said lead screw, a plurality of said intermediary spindles being rotatable at different speeds and having projecting ends to serve as alternative driving studs, one unit of said train of gearing being detachably securable upon one of the projecting spindle ends whereby one or the other of the latter becomes an active unit of said connection.

2. A thread milling machine comprising a work spindle, a tool spindle, means for rotating each, a movable support for one of said spindles, a lead screw operatively connected with said support and adapted to actuate the same, gear train spindles, gearing connecting said gear train spindles, a train of indexing gears adapted to connect one of said gear train spindles with said lead screw, a plurality of said gear train spindles having outwardly projecting ends disposed in the same vertical plane whereby the initial power unit of said indexing train may be shifted from one to the other and means for rotatably locking the selected initial power unit with the selected outwardly projecting end.

3. A thread milling machine comprising a work holder, a tool holder, means for rotating one of said holders, a movable support for one of said holders, a device operatively connected with said support and adapted to actuate the same, auxiliary spindles, change speed gearing upon said auxiliary spindles whereby to rotate two of them at different speeds, said two spindles having end portions in the same plane, and a train of indexing gears each adjustable to all of its units within said plane and adapted collectively to connect either one of said auxiliary spindle ends with said device whereby to cause the latter to functionate, said auxiliary spindle ends being splined, and a securing nut for holding one unit of said change speed gearing in place upon one of said splined ends.

4. A thread milling machine comprising a work holder, a tool holder, means for rotating one of said holders, a movable support for one of said holders, a device operatively connected with said support and adapted to actuate the same, spindles, change speed gearing upon said spindles whereby to rotate two at different speeds, said two spindles having portions in the same plane, and a train of indexing gears each adjustable as a unit within said plane and adapted collectively to connect either of said spindle portions with said device whereby to cause the latter to functionate, and means for effecting operative connection between one of said indexing gears and one of said pair of spindle portions.

5. A thread milling machine comprising a work holder, a tool holder, means for rotating one of said holders, a movable support for one of said holders, a device operatively connected with said support and adapted to actuate the same, spindles, change speed gearing upon said spindles and operatively connected with said rotating means whereby to rotate two at different speeds, said two spindles having projecting splined end portions, and a train of indexing gears some of which are adjustable and adapted collectively to connect either one of said spindle ends with said device whereby to cause the latter to functionate, one unit of said train being furthermore detachably connected with one of said pair of splined spindle ends, and means for securing such detachable unit in place.

6. In a metal cutting machine, the combination with a blank-carrying spindle, a cutting tool associated with the spindle, means for rotating said spindle, and means comprising a feed shaft for effecting relative feeding movements between the blank and the tool, of two auxiliary spindles respectively operated at different speeds by said spindle rotating means, and means comprising a train of gear wheels connected to said feed shaft and selectively connected to one of said auxiliary spindles according to the feed desired.

7. In a metal cutting machine, the combination with a blank-carrying spindle, a cutting tool associated with the spindle, a carriage for supporting said tool, and means for rotating said spindle, of a feed shaft for moving said carriage, two auxiliary spindles respectively operated at different speeds by said rotating means, and means comprising a train of gear wheels connected to said feed shaft and selectively connected to one of said auxiliary spindles according to the feed desired.

8. In a metal cutting machine, the combination with a blank-carrying spindle, a cutting tool associated with the blank, a carriage for supporting said tool, and means for rotating said spindle, of a feed shaft for moving said carriage, two auxiliary spindles respectively operated at different speeds by said spindle rotating means, and a train of gear wheels connected to said feed shaft, one gear wheel of said train being mounted on one or the other of said auxiliary spindles according to the feed desired.

In testimony whereof, we have hereunto subscribed our names.

CHARLES H. SCHURR.
ERNEST J. LEES.